No. 891,798.

PATENTED JUNE 23, 1908.

L. H. DYER.
COTTON GIN.
APPLICATION FILED FEB. 21, 1896.

Witnesses

Inventor

Leonard Huntress Dyer

No. 891,798. PATENTED JUNE 23, 1908.
L. H. DYER.
COTTON GIN.
APPLICATION FILED FEB. 21, 1896.

Witnesses.
Archie G. Reese
George P. Dyer

Inventor
Leonard H. Dyer
by Frank L. Dyer
Attorney.

UNITED STATES PATENT OFFICE.

LEONARD HUNTRESS DYER, OF WASHINGTON, DISTRICT OF COLUMBIA.

COTTON-GIN.

No. 891,798.

Specification of Letters Patent.

Patented June 23, 1908.

Application filed February 21, 1896. Serial No. 580,246.

*To all whom it may concern:*

Be it known that I, LEONARD HUNTRESS DYER, a citizen of the United States, residing at Washington, in the District of Columbia, have invented certain new and useful Improvements in Cotton-Gins; and I do hereby declare the following to be a full, clear, and exact description of the invention, which will enable others skilled in the art to which it appertains to make and use the same.

This invention relates to that class of cotton gins in which a breast formed of parallel slats is used, the intervals between the slats being smaller than the size of a cotton seed.

In the usual style of saw gin, the teeth of the saws pass through the breast and project beyond the other side thereof and engage with the staple, pulling it through the interstices and breaking it away from the seed. There has always been objection to this type of gin, as the saws greatly damage the staple, breaking it into short lengths before entirely detaching it from the seat. Furthermore the area of working surface is small compared to the size of the machine, as the teeth must enter a loop of the staple before stripping it from the seat.

In my invention I propose instead of the saws to use two rollers engaging together upon the side of the breast away from the side from which the bolls are fed. One or both of these rollers is fluted so as to admit of air passing through their point of juncture. An air blast is generated from a fan or by means of the rollers acting as fans, and the staple will be blown through the interstices of the breast, and will be nipped between the two faces of the rollers where it will be pulled until the seed is forced up against the slats of the breast, when the staple will become disengaged and the seed will drop away from the breast.

In order to allow the inside face of the breast to be located as close as possible to the point of contact of the rollers, I make it in the form of a rightangle, the acute apex of which is introduced between the rollers. As the breast must be of some considerable thickness in order to secure the requisite amount of strength, the inner part of the apex will still be some distance from the point of contact of the rollers. In order to get the apex still further in, I may make one roller much smaller than the other, this will make the angle of meeting greater than if both rollers were the same size. The breast may also be introduced in further by providing the faces of the rollers with parallel slits extending in from their peripheries to a depth equal to the thickness of the breast. The apex of the breast may then be introduced between the rollers through these slits, when the inner apex of the breast will be found to be coincident with the points of contact of the rollers.

In order to better understand the nature of my invention attention is called to the accompanying drawings in which:—

Figure 1, is an end view partly in section of the working parts of a gin embodying my invention; and Fig. 2, a front view of the rollers and breast with the brush removed; Fig. 3, is a section of the rollers and breast of the gin, both rollers being of equal size and being fluted; Fig. 4, is a section of the roller of a gin, showing both rollers solid without flutes and with a fan for generating an independent blast of air; Fig. 5, is a section of the gin showing one roller only provided with grooves; Fig. 6, is a section of a roller formed of a number of independent disks; Fig. 7, is a gin using belts in engagement; Fig. 8, is a section of a gin showing the axes of the rollers mounted in the same horizontal plane with the breast above; and Fig. 9, is a view of the same, showing the breast below.

In all of the views like parts are designated by the same numerals of reference.

1 represents a fluted roller; 2, a solid roller very much smaller in size. Both rollers are roughened or covered with a rough substance in order to properly nip the staple, and are both provided with parallel grooves 16 upon their circumference. The roller 1 is corrugated as shown, forming four wings or fans 3, 3. The breast is shown at 4, meeting at an acute angle at 5, within a short distance of the point of contact of the two rollers at 6.

The bolls being fed in at 7 will be drawn by the current of air caused by the rapid revolution of the rollers in the direction of the arrows between the slats of the breast. The staple will then be nipped between the face 8 of the roller 1 and the outer circumference of the roller 2, and will draw the seed up against the apex of the breast 5, when the fibers will be broken off. The staple will then be carried out and removed by the brush 14 in the direction of the point of exit 15. A grating 10 serves to support the bolls and maintain them in a position to be blown against the breast. After the staple has been removed from the seed, the latter will drop by gravity from the point 5, into a receptacle 9, behind and below the breast, the draft of air being regulated so that it will have sufficient force to lift up a boll and draw the staple through the breast, but will not be strong enough to hold up a ginned seed.

In case there should be difficulty in removing the seed from the apex of the breast, the entire breast or a portion of it may be arranged to be momentarily drawn away from its normal position to the position shown in broken lines of Fig. 1. A convenient means for effecting this movement is shown. The breast is pivoted at 11 and is connected a short distance above the point of pivoting, with a rod 12, to a cam 13, on one of the revolving members of the gin; in the illustration to the shaft of the inner roll of the feed apron. This movement will completely free the seed from all engagement with the rolls, and will allow them to drop downwards into the receptacle for their use.

In operating the gin, the rolls may be either positively driven by direct connections, or the construction illustrated may be employed. In this case the roll 1 is positively driven from some external source of power, while the roll 2 receives motion by engaging with the first roll; a balance wheel 17 serving to give uniformity to the movements of the second roll.

Fig. 3 represents a gin having both rolls fluted and of equal diameter, both rolls rotating at the same rate of speed as shown. The cotton is fed in the apex of the breast and the fiber or staple is drawn through.

Figure 1:
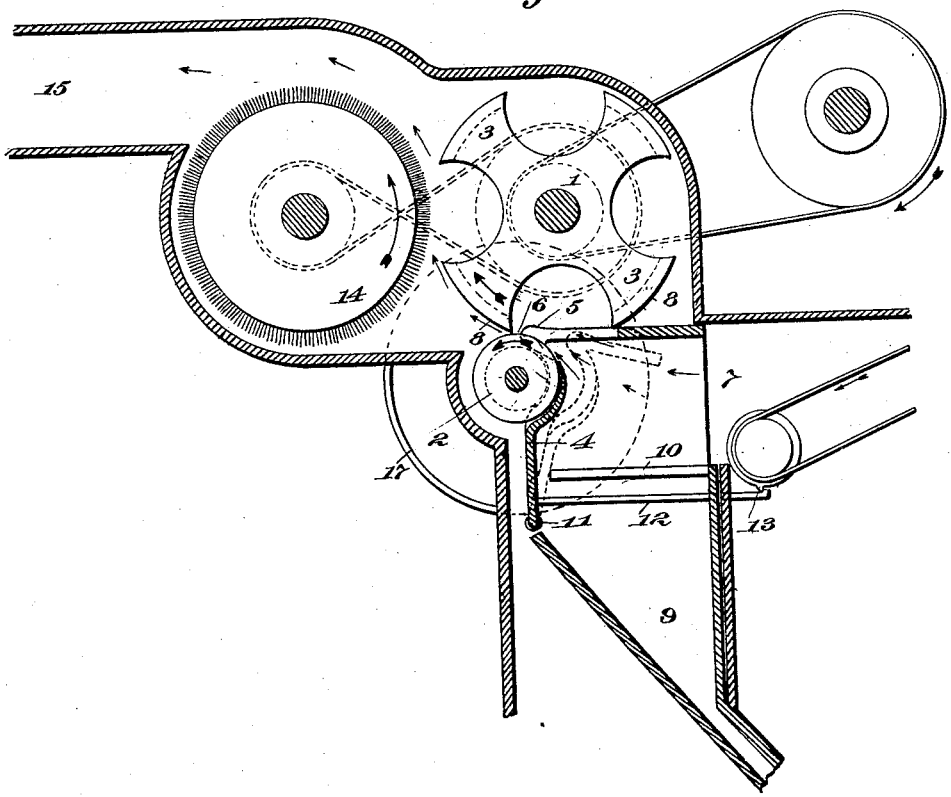
Figure 2:
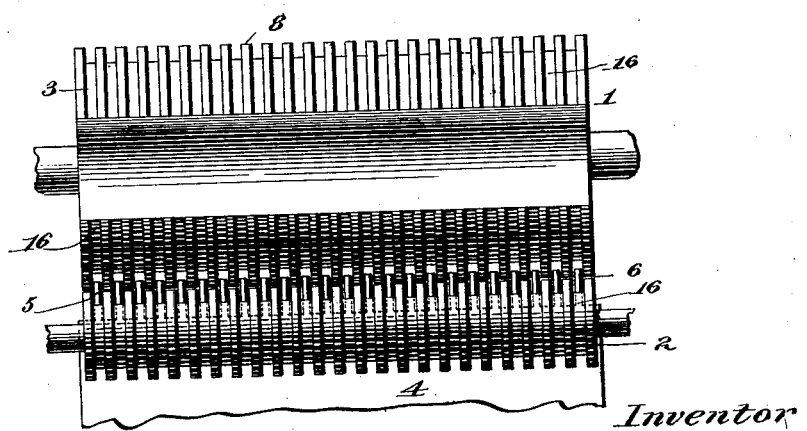
Figure 3:
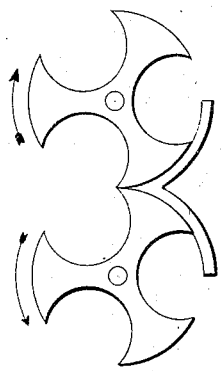
Figure 4:
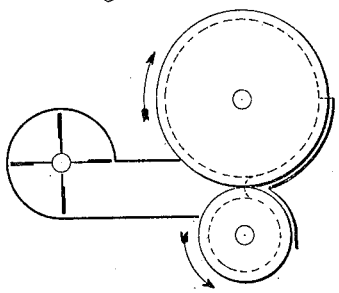
Fig. 4, is a gin showing both rolls solid, the blast of air being generated by a fan as shown.
Figure 5:
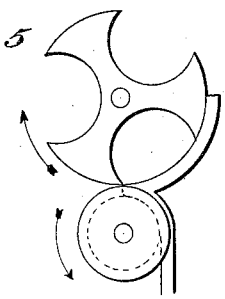
Fig. 5, shows a gin the lower roll of which is grooved for receiving the bars of the breast.
Figure 6:
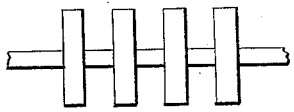

In the roller shown in Fig. 6, the disks are secured to a common shaft. These disks may be either plain or fluted as shown.

Figure 7:
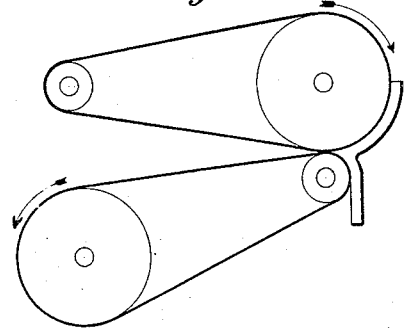

Another form of gin is shown in Fig. 7, wherein moving belts are used to grasp and carry away the staple.

Figure 8:
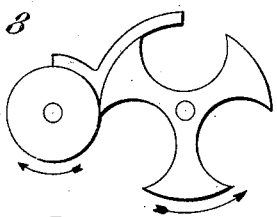
Figure 9:
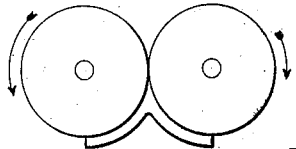

In Figs. 8 and 9, a gin is shown with the axes of the rolls mounted on the same horizontal plane. In Fig. 8 the breast is above the roll, the staple passing down by means of gravity, and in Fig. 9, the breast is below the rolls and the cotton is blown upward.

Before claiming my invention I desire to have it understood that I do not limit myself to the precise construction illustrated, as many of the elements shown may be changed or entirely eliminated without departing from the essence of my invention, (which is the employment of a breast with two moving surfaces engaging together, adjacent thereto,) as for instance, both rolls may be of the same size or approximately so; both may be fluted, or both may be plain, the air blast being independently generated, the air passing through the interstices between the rolls; only one or neither may be peripherally slitted; or they may be formed of a number of disks secured to a common spindle; or two engaging moving belts or other surfaces may be employed in lieu of rolls. The breast may be immovably secured to the frame of the gin, or it may be rapidly oscillated or shaken to assist in removing the staple, the relative position of the rolls may be varied, as for instance they may both be on the same horizontal or vertical plane, with the breast either below or above them. Some other means than gravity may be employed for removing the ginned seed, the brush may be dispensed with, and the lint removed by centrifugal action; and it is also obvious that any number of elements may be combined together in one gin.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention what I claim as new therein and desire to secure by Letters Patent is as follows:—

1. In a gin, the combination with an angular breast, having openings therein of smaller diameter than the seed, of two oppositely revolving rolls with their peripheral faces engaging together adjacent to the internal apex of said breast, whereby staple passing through the openings in said breast will be engaged between said rolls and thereby be separated from seed.

2. In a gin, the combination with an angular breast, having openings therein of smaller diameter than the seed, of two oppositely revolving rolls engaging together adjacent to the apex of said breast, and means for generating a blast of air through said breast and between said rolls, whereby staple will be drawn through the openings in said breast and will be engaged between said rolls and thereby be separated from seed.

3. In a gin, the combination with two oppositely revolving rolls, said rolls being fluted to form radial wings, the peripheries of which engage together, the said wings serving to generate a blast of air, of an angular breast, having openings of smaller diameter than the seed, the internal apex of which is adjacent to the pinching faces of said rolls.

4. In a gin, the combination with two oppositely revolving rolls, the peripheries of which engage together, one at least of said rolls being fluted to form radial wings, of an angular breast, having openings therein of smaller diameter than the seed, the internal apex of which is adjacent to the pinching faces of said rolls.

5. In a gin, the combination with two oppositely revolving rolls, the peripheries of which engage together, said rolls being peripherally grooved, of an angular breast, having openings therein of smaller diameter than the seed, the internal apex of which enters said grooves and is adjacent to the pinching faces of the rolls.

6. In a gin, the combination with two oppositely revolving rolls, the peripheries of which engage together, one of said rolls being peripherally grooved, of an angular breast, having openings therein of smaller diameter than the seed, the internal apex of which enters said grooves and is adjacent to the pinching faces of the rolls.

7. In a gin, the combination with two oppositely revolving rolls, the peripheries of which engage together, of an angular breast, having openings therein of smaller diameter than the seed, the internal apex of which is adjacent to the pinching faces of the rolls, and means for intermittently retracting and advancing the breast from the rolls.

8. In a gin, the combination with an angular breast having openings therein of smaller diameter than the seed, of two oppositely revolving rolls engaging together, said rolls being both laterally fluted and peripherally grooved, the said breast entering the grooves of said rolls with its internal apex adjacent to the pinching faces thereof, whereby staple will be drawn through the openings in said breast and will be engaged between the said rolls and thereby be separated from seed.

9. In a gin, the combination with two oppositely revolving rolls engaging together, of an angular breast, having openings therein of smaller diameter than the seed, the apex of the said breast being adjacent to the pinching faces of the rolls.

10. In a gin, the combination with two oppositely revolving rolls engaging together, of an angular breast having openings therein of smaller diameter than the seed, the internal apex of the said breast being adjacent to the pinching faces of the rolls.

11. In a gin, the combination with an angular breast, of a pair of rolls with their peripheral faces engaging together, the point of engagement being sufficiently near to the internal apex of the breast, to permit staple being drawn through the interstices of the breast by the action of the rolls and thereby be separated from the seed, substantially as set forth.

This specification signed and witnessed this 21st day of February 1896.

LEONARD HUNTRESS DYER.

Witnesses:
FRANK L. DYER,
L. DELLA MCGIRR.